Patented July 26, 1938

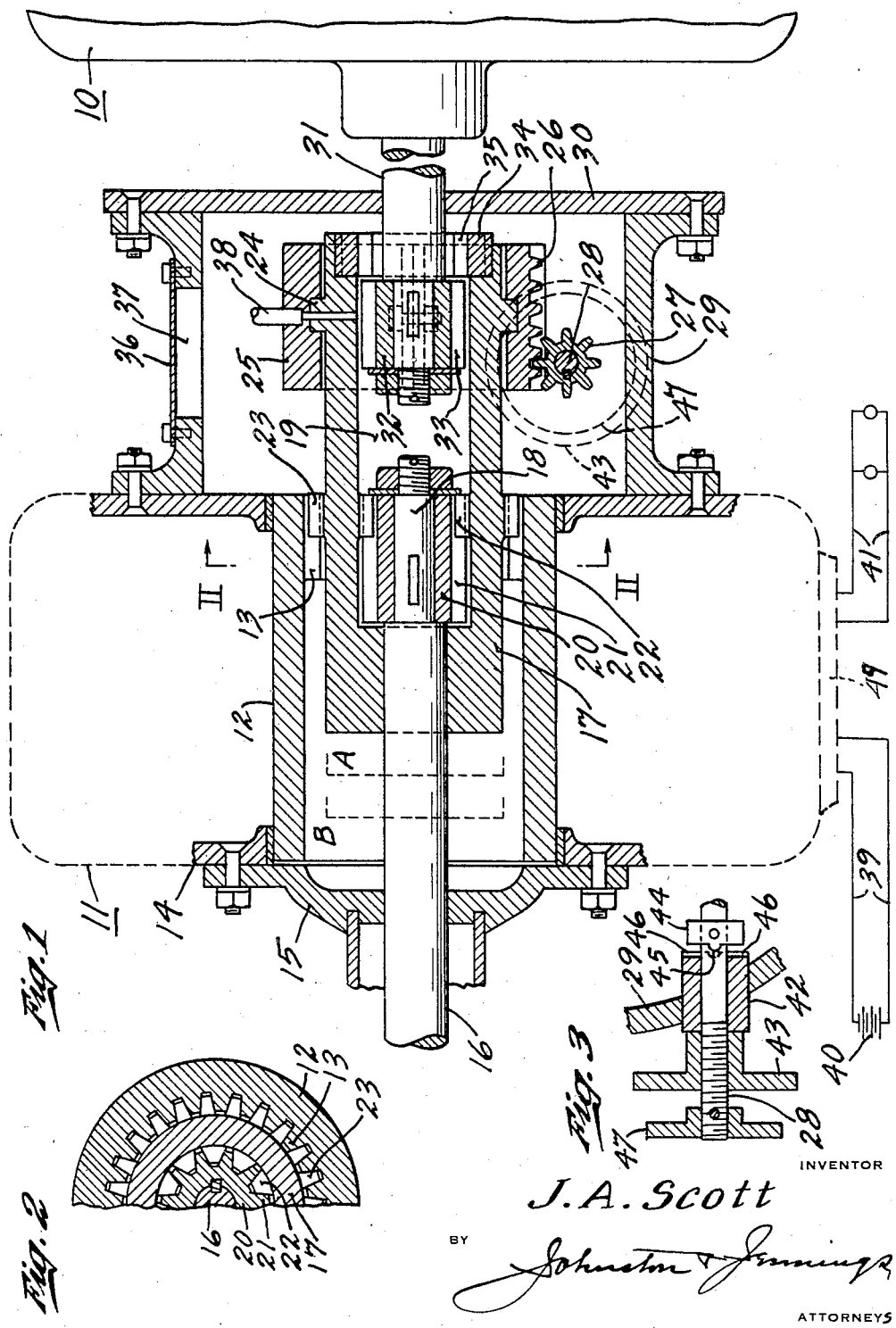

2,124,833

UNITED STATES PATENT OFFICE 2,124,833

SELECTIVE CLUTCH TRANSMISSION FOR MULTIPLE MOTOR DRIVES

James A. Scott, Arcadia, Fla., assignor of two-fifths to J. W. Nowlin, Tallahassee, Fla., and one-fifth to Edward S. Davies, Tampa, Fla.

Application November 7, 1936, Serial No. 109,725

3 Claims. (Cl. 74—389)

My invention relates to a novel selective transmission whereby two prime movers may be so coupled to a driven or work shaft that either may drive it and the other prime mover.

My invention further contemplates that one of the prime movers may be an electric motor and the other prime mover an engine preferably of the internal combustion type with the rotor of the electric motor, if desired, so connected as to function as a fly wheel for the engine. With such a combination of elements the engine may be utilized to drive the power shaft and, if desired, also the electric unit as a generator for the production of electric current for various purposes or, conversely, the electric unit as a motor may be coupled to the work shaft alone to drive it or to the work shaft and the internal combustion engine to start it and then may be wholly disconnected therefrom and from the work shaft or left with its rotor connected so as to function as a fly wheel for the engine.

My method of selective coupling of a plurality of motors to a comon work shaft has many important and advantageous applications, as for instance the work shaft may drive a pump and either of the prime movers can thus serve as the standby or emergency pump drive, eliminating the space and cost of an extra emergency pump set; when the internal combustion engine is used as the driving unit the rotor of the motor generator may be left connected to serve as its fly wheel or the electric unit can be driven so as to generate current either for charging its starting batteries or for lighting the plant or other purposes; when the power drive is applied for the propulsion of motor boats or vessels the electric unit, used as a starter, can be coupled to the engine shaft to start it and, in the event of failure of the latter, to serve as an emergency drive with the engine disconnected; and finally it is possible, if both prime movers are adapted to operate the drive shaft with the same R. P. M., to couple both thereto for joint service, should occasion demand. It will be understood that the foregoing are merely examples illustrative of the flexibility and advantages of my selective multiple motor control.

My invention further comprises the novel details of construction and arrangements of parts which, in their preferred embodiment only, are illustrated in the accopanmying drawing which forms a part of this specification, and in which:

Fig. 1 shows my improved selective clutch transmission in vertical central cross section with the electric unit indicated in dotted outline and the internal combustion engine shown fragmentally, the detailed structure of neither motor entering essentially into the novelty of my invention;

Fig. 2 is a half cross section taken on the line II—II of Fig. 1; and

Fig. 3 is a detail of the sleeve lock for the multiple clutch sleeve shifting mechanism.

According to the embodiment of my invention illustrated, I show as one prime mover an engine 10 which may be an ordinary internal combustion gasoline distillate or other motor or a Diesel engine of any standard type. I illustrate at 11 in dotted outline an electric unit adapted to function as a motor or generator having its rotor element (not shown) mounted upon the central sleeve 12 which is formed with an internal annular series of axially elongated clutch teeth 13 at its end toward the engine 10.

This sleeve 12 turns in suitable bearings, formally shown, interposed between it and the stator of the electric unit which comprises the frame elements 14. A head 15 is mounted at one end of the electric unit frame and comprises a bearing of any suitable character for the driven or work shaft 16 which projects therethrough into the sleeve 12 and is mounted to slide in a bearing formed at the left hand end of the multiple clutch sleeve 17. The reduced inner end 18 of the shaft projects into an annular recess 19 suitably formed in said sleeve and has mounted fast thereon an elongated clutch sleeve 20 provided with an external annular series of clutch teeth 21 which extend its full length, the sleeve being held in place on the shaft by a nut and washer assembly screwed on the threaded end of the shaft.

The multiple clutch sleeve 17 has an internal annular series of teeth 22 adapted to interfit, free to slide axially between the clutch teeth 21. The teeth 22 are shown formed integrally in the sleeve but they may be provided therein in any other practical way.

The multiple clutch sleeve 17 also carries an external annular set of clutch teeth 23 which have about one-half the length of the teeth 13 and are adapted to slidably and snugly interfit between same.

Near the right hand end of the multiple clutch 17, I provide an external annular rib or shoulder 24 adapted to be engaged in a complemental internal recess provided in a two part shifting collar 25; the elements of which are bolted together about the multiple clutch sleeve 17 in position to present the teeth of a rack 26 on the collar so that they will mesh with the teeth of a gear 27 keyed on a controller shaft 28 for shifting the collar, and with it the multiple clutch sleeve 17, to adjust the latter to the desired one of its several operating positions. The shaft 28 is suitably mounted in a housing 29 bolted to the right hand end of the electric unit frame and provided with an end plate 30 formed with a central aperture for the passage of the drive shaft 31 of the engine 10. This shaft may have any suitable bearings which need not be shown in detail.

The shaft 31 projects into the recess 19 in the multiple clutch sleeve 17 and is there reduced to receive a clutch sleeve 32 fast thereon and having an external annular set of axially elongated clutch teeth 33.

In a seat counterbored at the right hand end of the recess 19 in the multiple clutch sleeve 17 I mount fast a ring 34 havng an internal annular set of clutch teeth 35 adapted to slidably engage between the teeth 33 on the clutch sleeve 32, the teeth 35, in the position of the multiple clutch sleeve 17 shown in the drawing, being disengaged from the clutch sleeve 32.

The housing 29 is provided with a demountable cover 36 over an inspection opening 37 provided to give access to the shifting collar. The bearing between the shifting collar 25 and the sleeve 17, and also the clutch elements within the collar 17, are adapted to be lubricated through greasing ports by a connection 38 from a grease cup or other source of lubricant, suitable marks, not shown, being provided on the collar 25 and sleeve 17 to indicate when their greasing ports are in register. The control shaft 28 is provided with an external hand wheel 47 which can be turned with reference to suitable indicators, not shown, provided therefor on the housing so as to set the multiple clutch sleeve 17 in any one of its three operating positions indicated, one position being the full line position shown in the drawing, and the other two positions being those represented by dotted line indications A and B which represent the positions assumed by the left hand end of the multiple clutch sleeve 17 in different working positions.

It is desirable to provide conveniently accessible external means for locking the multiple clutch sleeve 17 in the selected operating position, and to this end one end of the shaft 28 is caused to project outwardly through a smooth bore in the boss 42 which forms its bearing support in the housing 29, as is shown more clearly in Fig. 3. The exposed end of the shaft 28 is threaded, the threads extending a fraction of an inch into the boss bore. The hand wheel 47 is made fast on the outer end of shaft 28 by means of a key, pin or like fastening. A lock wheel 43 is mounted in threaded engagement on the shaft 28 between the wheel 47 and the boss 42 and is adapted to take a bearing against the outer end of the boss 42. The shaft 28 has fast thereon a sleeve or collar 44 formed with a radial lug 45 adapted to be received in any one of three complemental grooves 46 in the seat element which the collar is adapted to engage. As shown this seat element is formed by the inner end of the boss 42, but it is to be understood that it could be formed by any other element on, or rigid with, the housing 29. These three grooves 46 are so disposed that when the lug is engaged in any one it will cause the multiple clutch collar to be set in the operating position respectively controlled by such groove. Thereupon, by tightening up on the lock wheel 43 as a jam nut the shaft 28 is locked. By loosening the jam nut I provide for the shaft 28 to slide to the right far enough to permit the lug on its collar 44 to be disengaged from a groove 46 and the shaft turned to bring the lug into register with another groove 46. After resetting the lug in the desired groove, the lock nut 43 is again screwed up tight against boss 42, drawing the collar 44 tightly against its seat and holding it, by means of the interlocked lug and groove, in stationary position. Since the collar 25 is held stationary by the engagement of its rack teeth 26 with the teeth of gear 27, the slight axial shift given the shaft 28 to effect the disengagement of the lug and groove will not shift the teeth on gear 27 out of mesh with the rack teeth 26. Any suitable indicators or markers may be provided, as above referred to, to enable an operator to readily turn the wheel 47 to the desired position to bring the lug 45 on collar 44 opposite the desired groove 46. It will be understood that any other suitable means for clamping or effectually locking the collar 25, and through it sleeve 17, selectively in the desired operating positions may be employed.

It will be noted that the three operating positions of the sleeve 17 are spaced slightly in excess of the length of the clutch teeth 22, 23 and 35, all of which have substantially the same axial length. As shown, the teeth 21 have more than three times the length of their complemental clutch teeth 22; the electric unit sleeve clutch teeth 13 are substantially twice the length of their complemental clutch teeth 23; and the engine sleeve clutch teeth 33 are more than twice the length of their complemental clutch teeth 35 on the multiple clutch sleeve 17.

Any suitable design of clutch elements, preferably an annular series, is provided to afford a powerful transmission. The electric unit 11 may be of any standard construction according to the duty required of it, and the engine 10 may be any suitable prime mover.

For the purpose of illustrating the adaptability of the electric unit to the uses aforesaid, I have shown circuits 39 leading therefrom to a battery 40, and power consuming circuits 41 leading therefrom for lighting, or other power purposes.

Having thus described in a general way the organization of my multiple clutch selective control and, it being understood that the driven or work shaft 16 is that which drives the pump or other power consuming unit, the operation is as follows.

With the multiple clutch sleeve 17 in its extreme position to the right, the driving shaft 31 of the engine 10 is disconnected from the teeth 35 and, therefore, from the sleeve 17, leaving the engine in an idling status and the electric unit above coupled up through its sleeve 12, clutch teeth 13, 23, 22, 21 and sleeve 17 to the power consuming shaft 16 which is thus driven by the electric unit 11 and is entirely disconnected from the engine 10.

By setting wheel 47, in the manner above described, in its intermediate position the multiple clutch sleeve 17 will be shifted to the position indicated at A, the clutch teeth 13 and 23, and 21 and 22 remain engaged and the clutch teeth 35 are brought into engagement between the teeth 33, whereupon through the multiple clutch sleeve 17 both prime movers 10 and 11 are connected together and to the power consuming shaft 16. Under such conditions, assuming the electric unit 11 is connected up to the battery 40 or other source of current to function as a motor it may, if synchronized with engine 10, cooperate therewith in driving shaft 16, but if its rotor is driven by the engine 10 it may serve as a generator to supply current to battery 40, and if desired to light circuit 41, suitable switches and rheostats being provided to control these circuits. When the electric unit 11 is not functioning as a motor, its rotor will function as a fly wheel when the shaft 16 is driven by the engine 10. But when the electric unit 11 is functioning as a motor with the engine 10 standing still, the electric unit may be used to turn over the engine shaft 31 and start up the engine 10, which is of importance when the latter is of the internal combustion type.

By setting the hand wheel 47 in its third position, the multiple clutch sleeve 17 will be shifted to the position indicated at B, and the clutch teeth 21 and 22, 35 and 33 remain engaged, but the clutch teeth 23 will pass out of mesh with the clutch teeth 13, thus leaving the electric unit in idling status and coupling the power consuming shaft only to the engine 10.

The apparatus is simple, compact, and inexpensive to manufacture and the transmission being through sleeves with spline couplings instead of gears, the wear will be nominal. The elements 30 and 34 are made removable to give convenient access to the parts within the sleeve 17, and the elements therein are capable of ready disassemblage.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a selective multiple motor drive, a transmission sleeve having a plurality of sets of external and internal clutch splines, a work shaft having splines clutched to one set thereof, a prime mover, a sleeve driven by said prime mover and adapted to telescope over said transmission sleeve and having a set of internal clutch splines disposed to be engaged with and disengaged from an external set of clutch splines on said transmission sleeve, a second prime mover and a clutch driven thereby in telescoping relation with said transmission sleeve and having a set of spline teeth disposed to be engaged with and disengaged from a set of splines on said transmission sleeve, and means to shift said latter sleeve to selectively clutch it to either or both prime movers, the set of clutch splines on the transmission sleeve being all of equal length and axially disposed and cooperating with splines varying in lengths in different sets to permit either prime mover to remain clutched to the transmission sleeve in a plurality of its operating positions.

2. In combination, an internal driven sleeve having an internal set of clutch splines, a transmission sleeve slidable axially within said driven sleeve and having an external set of clutch splines movable into and out of engagement with the clutch splines on said driven sleeve, a shaft telescoped into said transmission sleeve, a clutch element on said shaft having external splines, internal splines on said transmission sleeve with which said splines on the clutch element engage throughout the operating positions of said transmission sleeve, a second shaft having a splined clutch element thereon, a second set of internal clutch splines in said transmission sleeve movable into and out of engagement with the splined clutch element on said second shaft, the coacting splines of all sets being parallel and those coacting sets that are adapted to couple said shafts to said transmission sleeve comprising relatively long and short splines which in each pair of coacting sets are adapted to become disengaged in one operating position of said transmission sleeve, and means to shift and set said latter sleeve in its different operating positions.

3. In a selective transmission, a driven shaft, a prime mover having a driven element surrounding the driven shaft, a transmission sleeve telescoped within said driven element and splined to the driven shaft in all operating positions, splines on the transmission sleeve and the driven element respectively adapted to connect the prime mover to the transmission sleeve, a second prime mover having a driving shaft extending into the transmission sleeve in alinement with the driven shaft, spline clutch elements carried by the driving shaft, spline clutch elements carried by the transmission sleeve and adapted to be engaged with the clutch elements on the driving shaft, and means to shift the transmission sleeve selectively to connect either or both prime movers to the driven shaft through the transmission sleeve.

JAMES A. SCOTT.